United States Patent [19]

Özveren et al.

[11] Patent Number: 5,455,826
[45] Date of Patent: Oct. 3, 1995

[54] METHOD AND APPARATUS FOR RATE BASED FLOW CONTROL

[76] Inventors: Cüneyt M. Özveren, 25 Webster Ave., Apt. 507, Somerville, Mass. 02143; George Varghese, 2030-C Serenidad La., Maryland Heights, Mo. 63043

[21] Appl. No.: 268,076

[22] Filed: Jun. 28, 1994

[51] Int. Cl.$^6$ ..................................... H04L 29/04
[52] U.S. Cl. ............................... 370/60; 370/84
[58] Field of Search .................... 370/17, 60, 79, 370/84, 85.7, 94.1, 95.1; 375/38

[56] References Cited

U.S. PATENT DOCUMENTS

| | | | |
|---|---|---|---|
| 4,475,192 | 10/1984 | Fernow et al. | 370/60 |
| 4,769,811 | 9/1988 | Eckberg, Jr. et al. | 370/94.1 |
| 4,849,968 | 7/1989 | Turner | 370/60 |
| 5,199,027 | 3/1993 | Barri | 370/60 |
| 5,278,825 | 1/1994 | Wallmeier et al. | 370/84 |
| 5,285,446 | 2/1994 | Yonehara | 370/60 |
| 5,289,462 | 2/1994 | Ahmadi et al. | 370/60 |
| 5,335,224 | 8/1994 | Cole et al. | 370/84 |

OTHER PUBLICATIONS

1980, Fletcher, W. I., published by Prentice–Hall, Englewood Cliffs, N.J., *An Engineering Approach to Digital Design*, pp. 440–515.
1988, Tannenbaum, A. S., *Computer Networks*, 2nd Edition, pp. 280–284.
1989, DiGiacomo, J., published by McGraw–Hill, N.Y., *VLSI Handbook*, pp. 17.3–22.13.
Oct. 1991, Schroeder, M. D., Birrell, A. D., Burrows, M., Murray H., Needham, R. M., Rodeheffer, T. L., Satterthwaite, E. H., vol. 9, No. 8, *Autonet: A High–Speed, Self–Configuring Local Area Network Using Point–to–Point Links*.
Jun. 21, 1993, Kung, H. T., Chapman, A., *The FCVC (Flow Controlled Virtual Channels) Proposal for ATM Networks* (Draft).

*Primary Examiner*—Benedict V. Safourek
*Attorney, Agent, or Firm*—David A. Dagg

[57] ABSTRACT

A flow control system is disclosed, for a transmitting node and a receiving node. The transmitting node and the receiving node are linked together through multiple connections or virtual circuits over a communications link. A flow control circuit in the transmitting node limits the amount of bandwidth used over each individual connection, and over all of the connections combined. In an example embodiment, a global counter is used to maintain the total amount of bandwidth consumed overall during a predetermined time period, and a global limit register limits the maximum amount of bandwidth allowed consumed by any single connection during the time period. When the global counter exceeds an upper threshold value, the global limit register is set to a minimum value representing the minimum amount of bandwidth guaranteed to each connection during the time period. If a connection transmits an amount of bandwidth greater than or equal to the value in the global limit register, further transmissions on that connection are disabled for the remainder of the current time period.

6 Claims, 5 Drawing Sheets

METHOD AND APPARATUS FOR RATE BASED FLOW CONTROL

FIELD OF THE INVENTION

The disclosed invention relates generally to bandwidth allocation in communications networks, and more particularly to bandwidth allocation in communications networks requiring rate based flow control.

BACKGROUND

Bandwidth allocation relates to the amount of bandwidth required by a connection (also referred to as a "virtual circuit") for the network to provide a required quality of service. Two alternative approaches to bandwidth allocation exist: deterministic multiplexing and statistical multiplexing.

Deterministic multiplexing allows each connection to reserve its peak bandwidth when the connection is established. As a result, deterministic multiplexing causes large amounts of bandwidth to be wasted for bursty connections, particularly those with large peak transmission rate to average transmission rate ratios. Also, deterministic multiplexing goes against the principles of networking technologies such as Asynchronous Transfer Mode (ATM), since deterministic multiplexing restricts the utilization of network resources.

Statistical multiplexing allocates an amount of bandwidth to a connection that is less than the peak rate, but greater than the average or minimum rate for that connection. With statistical multiplexing, the sum of the peak rates of connections multiplexed onto a link can be greater than the total link bandwidth. The bandwidth efficiency due to statistical multiplexing increases as the proportion of total bandwidth allocated to each connection approaches the average bit rate and decreases as it approaches the peak bit rate for each connection. In general, especially when network traffic is bursty in nature, statistical multiplexing allows more connections to be multiplexed onto a network link than deterministic multiplexing, thereby allowing better utilization of network resources.

In current ATM designs, rate based flow control is provided using the "leaky bucket" method. The standard leaky bucket method causes the link bandwidth to be effectively partitioned among to the multiple connections, similar to a deterministic multiplexing system. For example, where Req/T is the requested rate allocated to each connection, a leaky bucket scheme which guarantees Req/T bandwidth to N connections would require a total of Req * N/T bandwidth. During operation, if a given one of the N connections requested greater than Req/T bandwidth, the request for that bandwidth in excess of Req would be denied even if the given connection was the only connection active on the link. Thus the leaky bucket method does not allow for statistical multiplexing gains in bandwidth allocation.

An example of an existing system using a leaky bucket method for the multiplexing of connection bandwidth is now given. In the example of the existing system, there is total link rate of 100 megabits per second for use by the transmitting node over all connections with the receiving node. Also, there are multiple connections on the transmitting node for variable bit rate connections with the receiving node, each connection having requested a transmission rate of 10 megabits per second. The existing system allocates the requested data rate to each connection, effectively partitioning the bandwidth on the system among the connections, and providing a deterministic multiplexing system. The existing system would allow a maximum of 10 connections having a 10 megabit data rate to be connected with the receiving node.

The example existing system does not take into consideration the bursty nature of traffic on variable bit rate connections. If there are 10 connections having 10 megabits per second data rates, and if a transmit request were to arrive for a 20 megabit burst, the transmission data rate would be limited to 10 megabits per second, even if all nine other connections were silent at the time of the request.

For these reasons and others, there is therefore a need for a flow control system for networking technology such as ATM, including a system for bandwidth allocation, providing the advantages of statistical multiplexing of bandwidth for multiple connections over a network link.

SUMMARY

In accordance with principles of the invention, there is disclosed a rate based flow control system which guarantees a minimum bandwidth to each of multiple connections on a network link, and additionally allocates a shared bandwidth pool among those multiple connections. The system is potentially applicable to traffic shaping as well as flow control applications.

The herein disclosed flow control system may be applied to any communications network in which multiple logical connections between a transmitting node and a receiving node share a single communications link over which data is exchanged. After a connection has been established between the transmitting node and the receiving node, and the transmitting node is actively transmitting on that connection, the connection is said to be active on the transmitting node. An example of a connection between a transmitting node and a receiving node is a Virtual Circuit (VC).

Hereinafter, the term "Data Transmission Unit" (DTU) is used to refer to a unit length of data transmitted from a transmitting network node to a receiving network node. The specific size of a DTU is implementation specific. Each message transmitted between a transmitting network node and a receiving network node has a size equal to some number of DTUs. The term "cell" is used herein to refer to a unit of data having size equal to one DTU. An example of a system using fixed sized messages known as cells is Asynchronous Transfer Mode (ATM). The example embodiments herein are described in terms of cells. It will be evident to one skilled in the art that the principles of the invention also apply to systems using variable length messages, such as packets or frames, to exchange data between network nodes. The term receive buffer will hereinafter be used to refer to a unit of data storage in a receiving node sufficient to store one cell.

The disclosed flow control system includes a shared bandwidth pool on the network link that is shared among the multiple connections between the transmitting node and the receiving node. The system further includes a connection specific bandwidth allocation associated with each one of the multiple connections between the transmitting node and the receiving node. Each connection specific bandwidth allocation is available for transmitting DTUs over the associated connection. Thus, there is a connection specific bandwidth allocation reserved for each possible connection that is established between the transmitting node and the receiving node.

The disclosed flow control circuit in the transmitting node ensures that rate based flow control parameters are not violated, reserves bandwidth sufficient to support a minimum data rate allocated for each connection, and limits the total data rate offered by the transmitting node over all connections with the receiving node. By reserving a minimum bandwidth for each connection between the transmitting node and the receiving node, the flow control circuit provides the transmitting node a predetermined quality of service over each connection.

The disclosed flow control circuit controls the bandwidth consumed by the transmitting node during periodic time intervals referred to as "epochs". The flow control circuit in the transmitting node includes a global counter counting the number of DTUs transmitted from the transmitting node to the receiving node since the beginning of the current epoch. When the global counter exceeds the maximum number of DTUs allowed to be transmitted by the transmitting node over all connections with the receiving node during a single epoch, the data rate over each individual connection is limited to the minimum data rate for each connection for the remainder of the epoch. The global counter is set to zero at the beginning of each epoch.

In the disclosed system, the bursty nature of traffic on a variable bit rate connection is recognized, and bandwidth is statistically multiplexed across connections between the transmitting node and receiving node. In an example embodiment of the disclosed system, the receiving node is guaranteed that every T units of time at most MaxRate * T cells are transmitted by the transmitting node over all connections with the receiving node. Each connection is guaranteed a minimum data rate of Min/T, and Max/T is the maximum data rate possible for a given connection. An Upper Threshold UT is calculated by the equation:

(MaxRate * T)−(Min * N), where N is equal to the number of connections established between the transmitting and receiving node. The epoch for the example system has duration of length T.

The example of the disclosed system includes a connection counter for each connection between the transmitting and receiving node. The connection counter for a connection contains the total number of DTUs transmitted by that connection during the current epoch. At the beginning of each epoch, all connection counters are set to zero. The example of the disclosed system further includes a global limit register and a global counter. At the beginning of each epoch, the global limit register is set to Max, and the global counter is set to zero. After each transmission from the transmitting node to the receiving node, the global counter is incremented by the amount of number of DTUs in the transmission. If the resulting value of the global counter exceeds UT, the value of the global limit register is set to Min.

Each time there is a transmission on a given connection, the value of the connection counter for that connection is compared with the value in the global limit register. If the connection counter exceeds the value in the global limit register, further transmissions on that connection are disabled for the remainder of the current epoch. Transmissions on that connection are re-enabled at the beginning of the next epoch. The flow control circuit guarantees sufficient bandwidth to support a minimum transmission rate of Min/T for each of N virtual circuits, and T is the duration of the epoch timer 32. The maximum total bandwidth permitted over the communications link from the transmitting node to the receiving node is sufficient to support a transmission rate of MaxRate. A shared pool of bandwidth sufficient to allow a number of DTUs equal to (MaxRate * T)−(N * Min) to be transmitted during T time units, is shared among all connections between the transmitting node and the receiving node. The number of DTUs that may be transmitted using the shared bandwidth pool is referred to as "CommonPool". Thus at light loads each connection may transmit Max cells every T units of time, where Max is greater than or equal to Min and less than or equal to CommonPool. In heavily loaded conditions each connection may send Min=C cells every T units of time.

In the example embodiment above, the same values of Max and Min are used for all connections. In an alternative embodiment Max and Min are chosen on a per connection basis. In the alternative embodiment in which values for Max and Min are chosen independently per connection, the equation for CommonPool is:

$$(\text{MaxRate}*T) - \sum_{i=1}^{N} \text{Min}(i)$$

where Min(i) is the value of Min for connection i.

The above example embodiment also decrements the global limit register from Max to Min in a single step. In an alternative embodiment the global limit register transitions between Max and Min by multiple discrete levels. In the alternative embodiment, the value of the global limit register is set based on a decreasing linear function of the global counter, such that the value of the global limit register is decremented from Max to Min as the global counter increases from a predetermined value to UT.

These and other features and advantages of the present invention will become apparent from a reading of the detailed description in conjunction with the attached drawings in which like reference numerals refer to like elements in the several views.

DETAILED DESCRIPTION

Virtual Circuits

Figure 1:
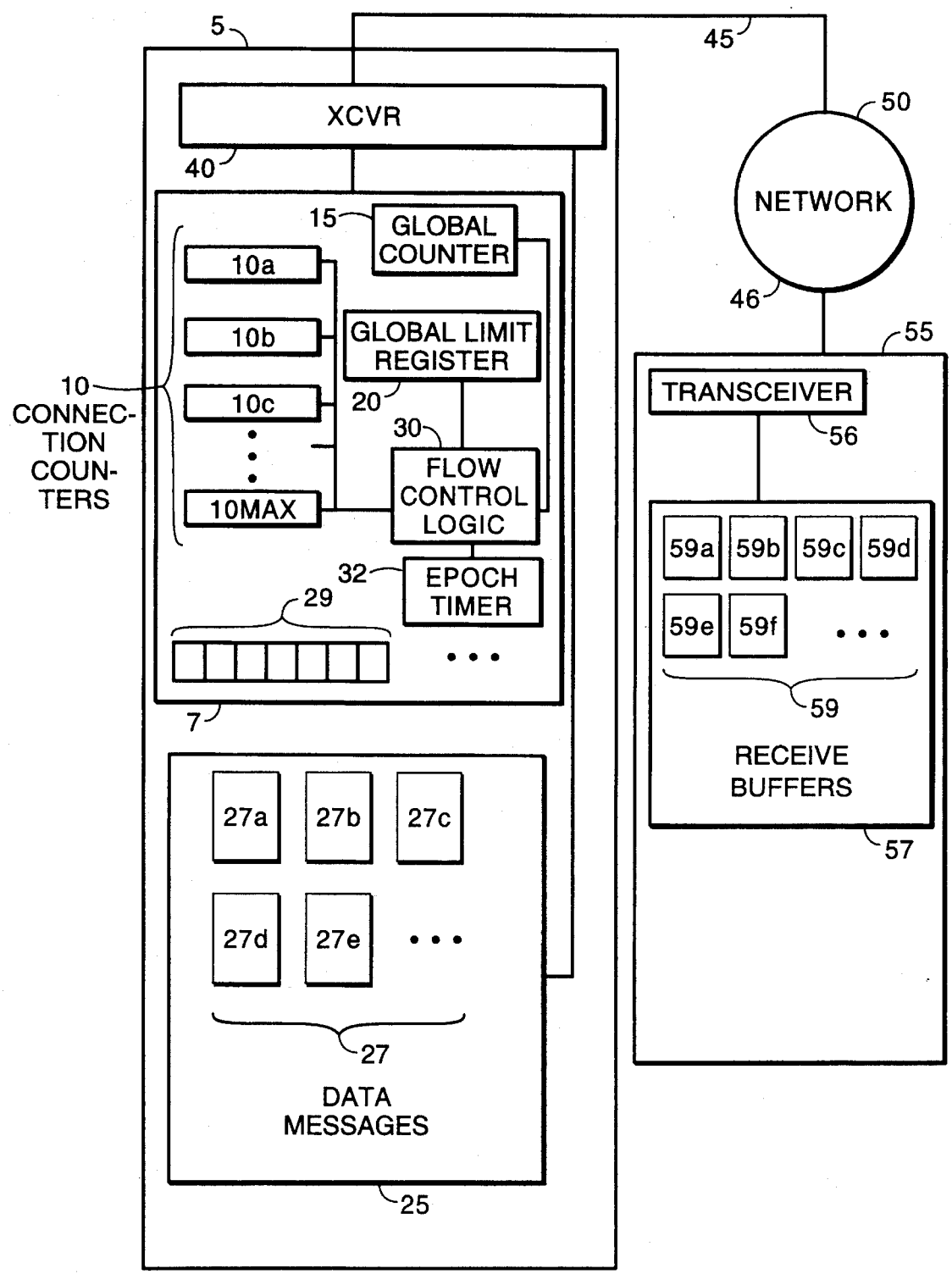
FIG. 1 is a logic drawing of an example embodiment of the disclosed flow control apparatus.

In computer networks, a logical connection between a first node and a second node is known as a virtual circuit. Generally, when a virtual circuit is established, a route from the first node to the second node is chosen as part of the connection setup. That route is used for all subsequent traffic flowing over the connection.

To allow messages sent over a virtual circuit to always take the same route, each node along the route maintains a virtual circuit table with one entry per virtual circuit. Typically, each message travelling over a given virtual circuit contains a field or fields identifying the virtual circuit over which the cell is transmitted. Further, the field or fields in the message typically identify an entry in a virtual circuit table within each node along the route.

A virtual circuit table entry contains control bits for the associated virtual circuit, for example a control bit that enables and disables transmission on the associated virtual circuit. A discussion of virtual circuits is given in many textbooks, for example the book by Andrew S. Tanenbaum, "Computer Networks", Second Edition, published by Prentice-Hall, Inc., a division of Simon and Shuster, Englewood Cliffs, N.J., 1988, at pages 280 through 284, all disclosures of which are herein included by reference.

Virtual circuits are also used to reserve receive buffers in the first node and the second node, and within intermediate nodes between the first node and second node. In this way a virtual circuit is used to define a predetermined level of throughput between the first node and the second node. The predetermined level allows the second node to reserve sufficient receive buffers to store data transmitted from the first node such that data transmitted from the first node is not discarded for lack of receive buffers.

A flow control system must ensure that no more data is transmitted than can be stored in the receive buffers in the receiving node. In rate based flow control systems, the rate of transmission from the transmitting node to the receiving node is controlled such that the rate does not cause the receiving node to run out of receive buffers to store messages transmitted from the transmitting node. Thus a rate based flow control system will minimize or eliminate the number of messages discarded by the receiving node due to lack of available receive buffers.

Data Transmission Units

"Data Transmission Unit" (DTU) is used herein to refer to a unit length of data transmitted from a transmitting network node to a receiving network node. The specific size of a DTU is implementation specific. Each message transmitted between a transmitting network node and a receiving network node has a size equal to some number of DTUs. The term "cell" is used herein to refer to a unit of data having size equal to one DTU. An example of a system using fixed sized messages known as cells is Asynchronous Transfer Mode (ATM). The example embodiments herein are described in terms of cells. It will be evident to one skilled in the art that the principles of the invention also apply to systems using variable length messages, such as packets or frames, to exchange data between network nodes.

Flow Control System

FIG. 1 is a logic drawing of the elements in a flow control apparatus. A first network node 5 is shown containing a transceiver circuit 40, a flow control circuit 7, and a memory 25. For purposes of example, the transceiver circuit 40 is shown coupled with a network 50 via a communications link 45. The transceiver circuit 40 is further coupled with the flow control circuit 7, and the memory 25.

The flow control circuit 7 contains a set of one or more connection counters 10, including connection counters 10a, 10b, 10c ... 10n, where n is the maximum possible number of potential virtual circuits with a second node 55, as well as a global limit register 20, a global counter 15, an epoch timer 32, and a flow control logic 30. The connection counters 10, as well as the global limit register 20, the epoch timer 32, and the global counter 15, are coupled with the flow control logic 30. The flow control circuit 7 further contains a virtual circuit table 29, having an entry for every possible virtual circuit between the first network node 5 and other network nodes.

In the example embodiment of FIG. 1, the connection counters 10, global counter 15, and global limit register 20 are contained in the flow control circuit 7. Alternatively, it will be evident to those skilled in the art that some or all of connection counters 10, global counter 15, and global limit register 20 may be memory locations allocated by a program running on a node processor. It will further be evident to those skilled in the art that the network 50 could be a local area network (LAN), a wide area network (WAN), a metropolitan area network (MAN), or other type of communications system.

The second network node 55 is coupled with the network 50, via a link 46. The second network node 55 includes a transceiver 56 coupled with the network 50. A memory 57 in the second network node 55 includes a set of one or more receive buffers 59, for storing cells or messages received from the first network node 5.

The flow control circuit reserves bandwidth sufficient to support a data rate of Min/T from the first network node 5 to the second network node 55 over a given VC. The remaining bandwidth is a shared bandwidth pool maintained by the flow control circuit, for transmitting data over any VC between the first network node 5 and the second network node 55. The memory 25 in the first network node 5 further contains a set of one or more data messages 27, the data messages 27 containing data to be transmitted by the first network node 5 to the second network node 55.

It will be evident to those skilled in the art of computer and data communications that the flow control circuit 7, and the transceiver circuit 40 in the first network node 5, may be implemented using standard integrated circuit devices. A further discussion of such devices is given in many textbooks, for example "An Engineering Approach to Digital Design", by William I. Fletcher, published by Prentice-Hall, Englewood Cliffs, N.J., 1980, at pages 440 through 515, all disclosures of which are herein included by reference.

It will further be evident to one skilled in the art that the above listed elements may be implemented using one or more Application Specific Integrated Circuits (ASICs), or Programmable Logic Devices (PLDs). A further discussion of ASIC and PLD design is given in many textbooks, for example "VLSI Handbook", by Joseph DiGiacomo, published by McGraw-Hill Publishing Company, N.Y., 1989, at pages 17.3 through 22.13, all disclosures of which are herein included by reference.

During operation of the elements shown in FIG. 1, first network node 5 and second network node 55 establish a number N virtual circuits with each other. The operation of the elements shown in FIG. 1 guarantees bandwidth sufficient to support a minimum transmission rate of Min/T for each of the N virtual circuits where T is the duration of the epoch timer 32, and Min is a number of Data Transmission Units. The maximum data rate permitted over the communications link 45 is equal to MaxRate. A shared bandwidth pool equal to MaxRate−(N * Min/T) is shared among the N virtual circuits. The number of DTUs that may be transmitted using the shared bandwidth pool is referred to as "CommonPool", and is equal to (MaxRate * T)−(N * Min). The operation of the elements shown in FIG. 1 guarantees that each virtual circuit is allocated a maximum transmission rate of Max/T, where Max is greater than or equal to Min, and less than or equal to CommonPool. The specific value of Max is based on user traffic requirements.

For each virtual circuit between first network node 5 and second network node 55, there is an entry in virtual circuit table 29 within the first network node. Messages transmitted between the first network node 5 and the second network node 55 contain indication of a specific virtual circuit over which they are transmitted, for example a field containing a virtual circuit number indexing entries in the virtual circuit table 29.

Within the first network node 5, the flow control logic 30 sets each connection counter 10 to zero when each virtual circuit is established, and whenever the link between the first network node 5 and the second network node 55 is broken and then subsequently re-established. The global counter 15 is initialized to 0 when the first virtual circuit is established between the first network node 5 and the second network node 55.

The flow control logic 30 sets each connection counter to zero responsive to the epoch timer 32 indicating that an epoch has completed, where an epoch is equal to a time period of T duration. The epoch timer 32 has a period equal to T, and begins running responsive to establishment of the first virtual circuit between the first network node 5 and the second network node 55.

In an alternative embodiment, the connection counter 10 for a specific virtual circuit is initialized to some number k greater than zero, and subsequently each time period T the flow control logic 30 sets that connection counter 10 equal to k. In this way, the bandwidth allocated for that specific virtual circuit is to be limited relative to other connections.

Again referring to the operation of the elements in FIG. 1, the flow control logic 30 maintains the global counter 15 as the total number of DTUs transmitted from the first network node 5 to the second network node 55 during the current epoch, responsive to each transmission from first network node 5 over communications link 45 to second network node 55.

The flow control logic 30 also modifies the global limit register 20 responsive to the current value in the global counter 15 after each transmission on communications link 45 from first network node 5 to second network node 55. When the global counter exceeds an upper threshold value UT, where UT is equal to (MaxRate * T)−(Min * N), then the flow control logic 30 sets the value of the global limit register 20 to Min. In a first example embodiment, the flow control logic 30 sets the global limit register equal to Max responsive to expiration of the epoch timer 32.

There is a global counter and global limit register within the first network node 5 for each possible remote node with which the first network node 5 has one or more virtual circuits. In an example embodiment, in which the network 50 is a point to point link, then only the second network node 55 is reachable by the first network node 5. In that example embodiment, the first network node 5 has one global limit register and one global counter.

Figure 2:
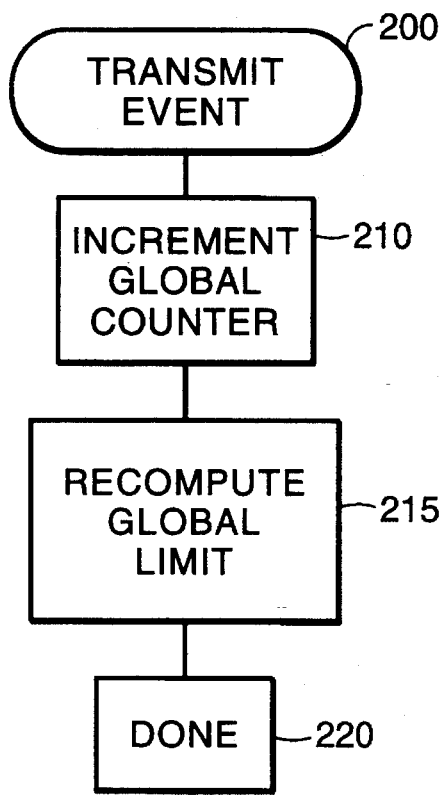
FIG. 2 is a flow chart showing the steps of a method for maintaining a global counter and a global limit register responsive to data transmission.

FIG. 2 shows the steps performed to maintain the global counter and the global limit register as one of data messages 27, (27a for purposes of example), is transmitted from first network node 5 of FIG. 1. The steps of FIG. 2 are performed by an example embodiment of the flow control logic 30 shown in FIG. 1.

Now with reference to the elements shown in FIG. 1 and the steps in the control flow shown in FIG. 2, the operation of the elements in FIG. 1 is further described. In FIG. 2, data message 27a is transmitted by the first network node 5 to the second network node 55 in step 200. Next, in step 210, the flow control logic 30 responds to the transmission in step 200 by incrementing the global counter 15 by the number of DTUs required to transmit data message 27a. In the example embodiment, the data message 27a is a cell, and requires one DTU of bandwidth to be transmitted. In the example embodiment, the global counter 15 is therefore incremented by 1. Finally in step 215, the flow control logic 30 recalculates the value of the global limit register 20 responsive to the value of the global counter 15.

After the data message 27a is transmitted from the first network node 5, it is received by the second network node 55. The transceiver 56 within the second network node 55 receives the data message 27a and writes the data message 27a into a subset of one or more of the receive buffers 59, for example receive buffer 59a.

Figure 3:
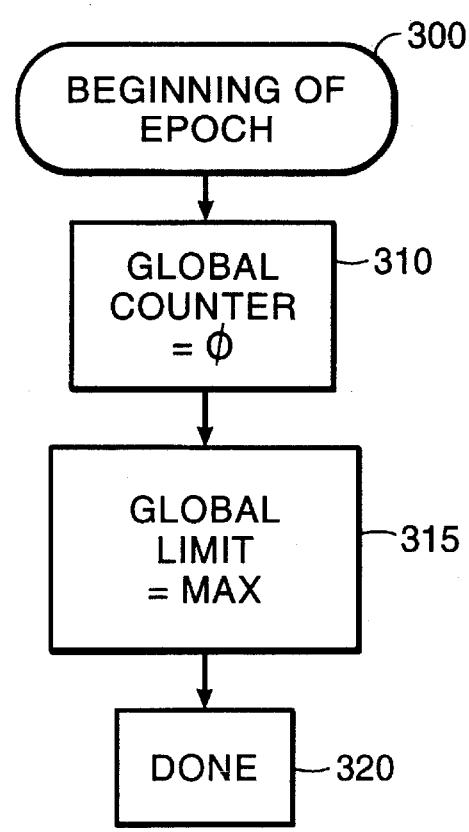
FIG. 3 is a flow chart showing steps of a method for maintaining a global counter and a global limit register at the beginning of an epoch.

FIG. 3 shows the steps performed by an example embodiment of the flow control logic 30, within the first network node 5 of FIG. 1, upon expiration of the epoch timer 32, to maintain the global limit register 20 and the global counter 15. First the expiration of the epoch timer 32 is detected in step 300. Next, the global counter 15 is set to zero in step 310. In step 315, following step 310 in FIG. 3, the value of the global limit register 20 is set to Max.

Following step 315, the processing in response to the expiration of the epoch timer 32 expiration completes in step 320, until the next expiration of the epoch timer 32. In the example embodiment of FIG. 3, the epoch timer 32 is a free running timer, continuing to run after it expires.

Figure 4:
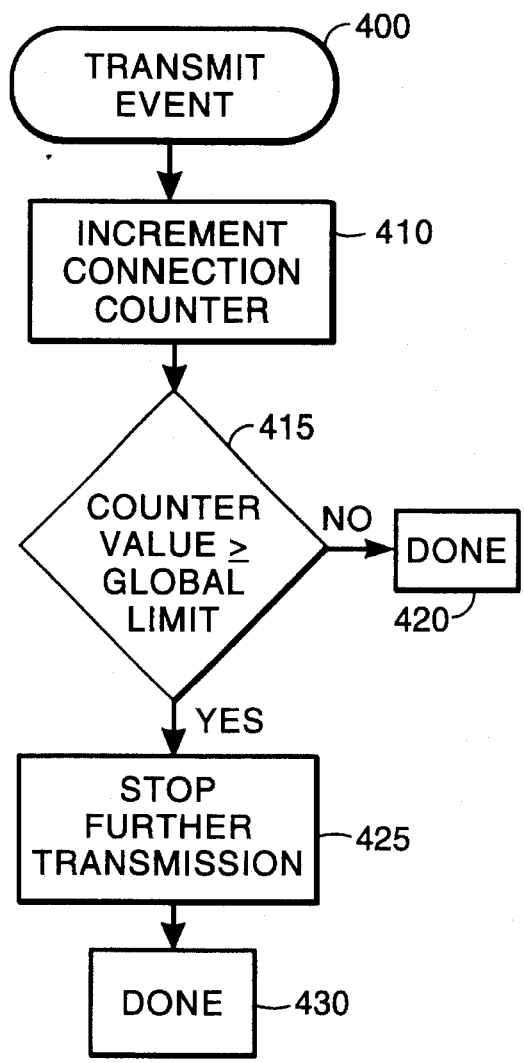
FIG. 4 is a flow chart showing steps of a method for maintaining a connection counter during transmission.

FIG. 4 shows the steps performed to maintain the connection counters 10 when one of data messages 27 is transmitted by the first network node 5. The steps of FIG. 4 are performed by an example embodiment of the flow control logic 30 in the first network node 5 of FIG. 1.

First in FIG. 4, one of data messages 27 (for example 27a) is transmitted over a given virtual circuit between the first network node 5 and the second network node 55 in step 400. Next, the connection counter 10 for that virtual circuit (for example connection counter 10a) is incremented in step 410 by the number of DTUs required to transmit the data message 27a. For example, if the data message 27a is a cell, requiring one DTU of bandwidth to transmit, the connection counter 10a is incremented by 1.

Next, in step 415 the connection counter 10a is compared with the value of the global limit register 20. If the connection counter 10a is less than the global limit register 20, processing completes for this transmission in step 420. If the connection counter 10a is greater than or equal to the value of the global limit register 20, step 425 is performed. In step 425, the flow control logic 30 stops further transmission on the virtual circuit corresponding to connection counter 10a. Transmission on a virtual circuit can, in an example embodiment, be stopped by setting a Transmission Disable bit in the entry for that virtual circuit in the virtual circuit table 29 of FIG. 1. Following step 425, the process completes for the transmission in step 430.

Figure 5:
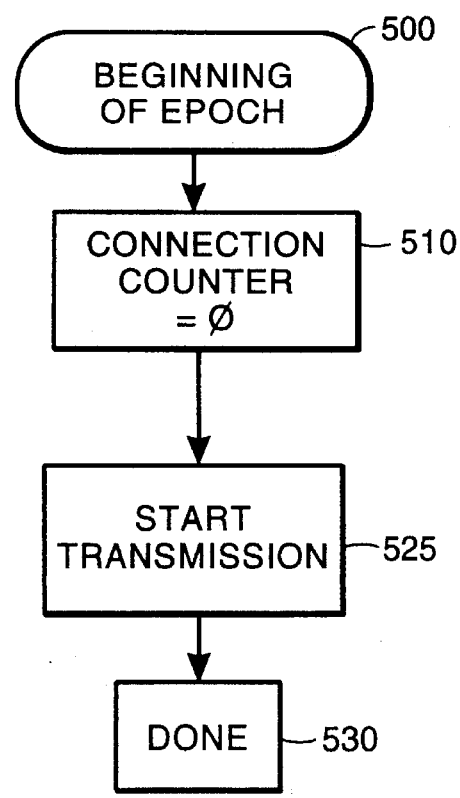
FIG. 5 is a flow chart showing steps of a method for maintaining a connection counter at the beginning of an epoch.

FIG. 5 shows the steps performed by an example embodiment of the flow control logic 30 shown in FIG. 1 to maintain the connection counters 10 of the first network node 5 in FIG. 1 upon expiration of the epoch timer 32. First in step 500, the flow control logic detects that the epoch timer 32 has expired. Next, in step 510, the flow control logic 30 sets all connection counters 10 to zero.

Continuing with reference to the elements in FIG. 5, step 510 is next followed by step 515. In step 515, if transmissions for any of the virtual circuits corresponding to connection counters 10 had previously been disabled, transmissions are re-enabled on those virtual circuits. Following step 525, the process completes in step 530.

Figure 6:
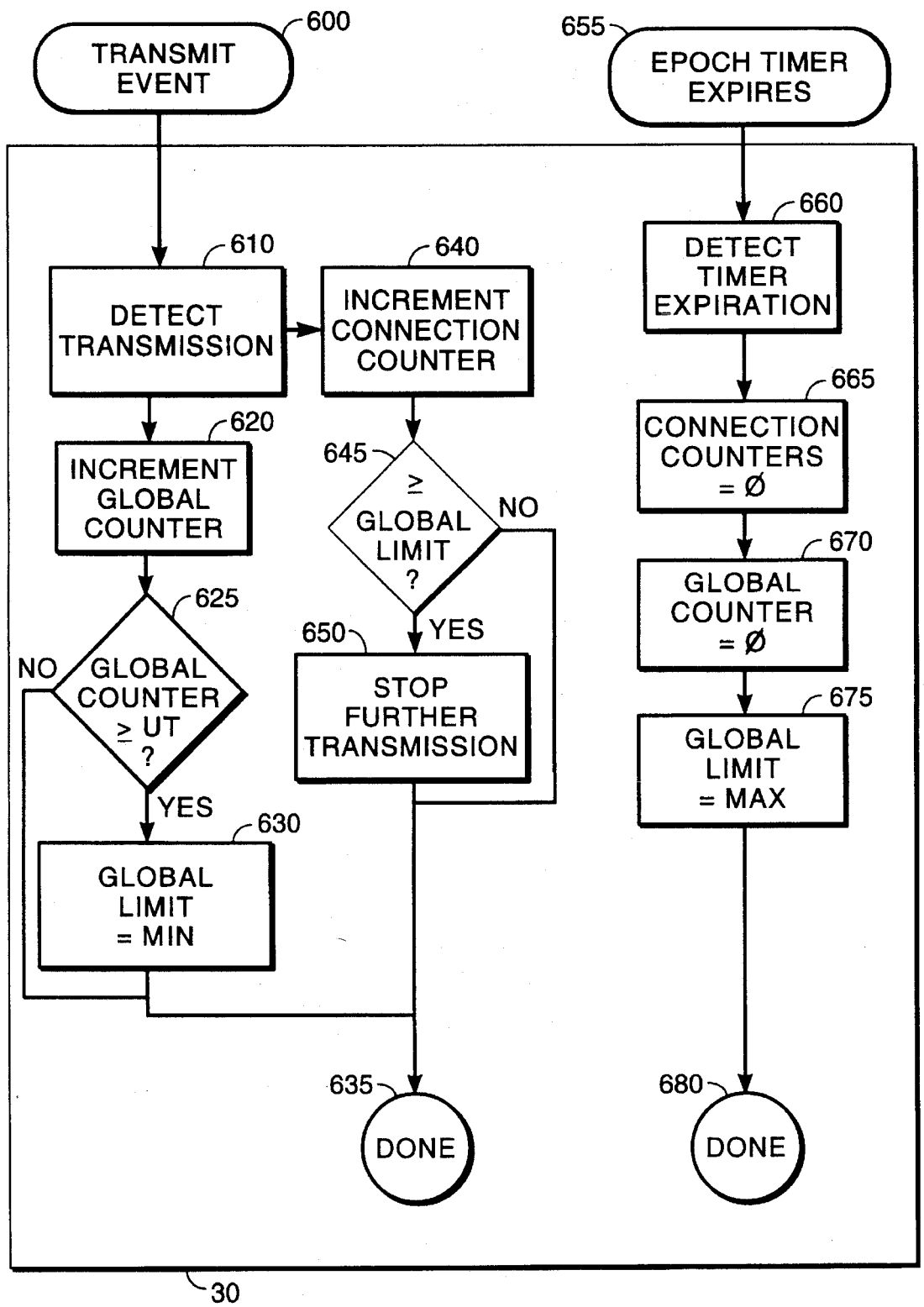
FIG. 6 is a detailed logic diagram of the flow control logic shown in FIG. 1.

FIG. 6 is a detailed logic diagram of an example embodiment of the flow control logic 30 shown in FIG. 1. In the example embodiment of FIG. 6, the flow control logic 30 is an ASIC, containing several logic processes. FIG. 6 shows the flow control logic 30 having a transmission event detecting process 610, coupled with a global counter-incrementing process 620 and a connection counter incrementing process 640. The global counter incrementing process 620 is coupled with a first comparison process 625, which in turn is coupled with a first global limit setting process 630.

The connection counter incrementing process 640 is coupled with a second comparison process 645, which in turn is coupled with a transmission disabling process 650. FIG. 6 further shows a timer expiration detecting process 660, coupled with a connection counter clearing process 665, which is coupled with a global counter clearing process 670, which in turn is coupled with a global limit setting process 675.

During operation of the elements in FIG. 6, when a transmission event 600 occurs, the transmission event detecting process 610 detects the transmission event 600. For example, a transmission event 600 follows a request by a user in a first network node to send a cell to a second network node over a virtual circuit between the first network node and the second network node. The transmission event is then detected when the transmission of the cell from the first network node occurs.

Following the transmission event detecting process 610 detecting the transmission event 600, the global counter incrementing process 620 increments the global counter by the number of DTUs in the transmitted message. If the transmitted message was a cell, then the global counter is incremented by one.

After the global counter incrementing process 620 increments the global counter, the first comparison process 625 compares the new value of the global counter with Upper Threshold UT. If the first comparison process 625 determines that the value of the global counter is greater than or equal to the upper threshold UT, then first comparison step 625 is followed by global limit setting process 630. If the first comparison process 625 determines that the global counter is not greater than the upper threshold UT, then first comparison process 625 is followed by completion in step 635.

The connection counter incrementing process 640 increments the connection counter corresponding with the virtual circuit over which the transmission was made by the number of DTUs required to perform the transmission. For example, if a cell was transmitted, the connection counter corresponding with the virtual circuit over which the cell was transmitted is incremented by one.

Following the connection counter incrementing process 640 incrementing the connection counter for the virtual circuit of the transmission event 600, in second comparison process 645 the incremented connection counter is compared with the value of the global limit register for the second network node. If the incremented connection counter is greater than or equal to the global limit register, then the transmission stopping process 630 stops further transmissions on that virtual circuit. In an example embodiment, the current transmission is also stopped. In an alternative example embodiment, the current transmission is allowed to complete, while subsequent transmissions on that virtual circuit are disabled for the remainder of the current epoch. If the incremented connection counter is less than the global limit register, then the transmission is allowed to complete, and the cell transmitted from the first network node to the second network node.

In an example embodiment, the logic processes 620, 625, and 630 may execute in parallel with the logic processes 640, 645, and 650, subsequent to the transmission event detecting process 610 detecting the transmission event 600.

Further during operation of the elements of FIG. 6, the timer expiration detecting process 660 detects the expiration of the epoch timer 655. Subsequent to the timer expiration detecting process 660 detecting the expiration of the epoch timer 655, the connection counter clearing process 665 clears all the connection counters. After the connection counter clearing process 665 clears all the connection counters, the global counter clearing process 670 sets the global counter to zero. Following the global counter clearing process 670 setting the global counter to zero, the global limit setting process 675 sets the global limit to Max. After the global limit setting process 675 completes, those processes 660, 665, 670 and 675 which are responsive to detection of the expiration of the epoch timer 655 reach completion. It will be evident to one skilled in the art that the order of processes 660, 665, 670 and 675 shown in FIG. 6 is given for purposes of example, and other orders are possible dependent on the constraints of specific implementations.

Node Processor Based Embodiment

Figure 7:
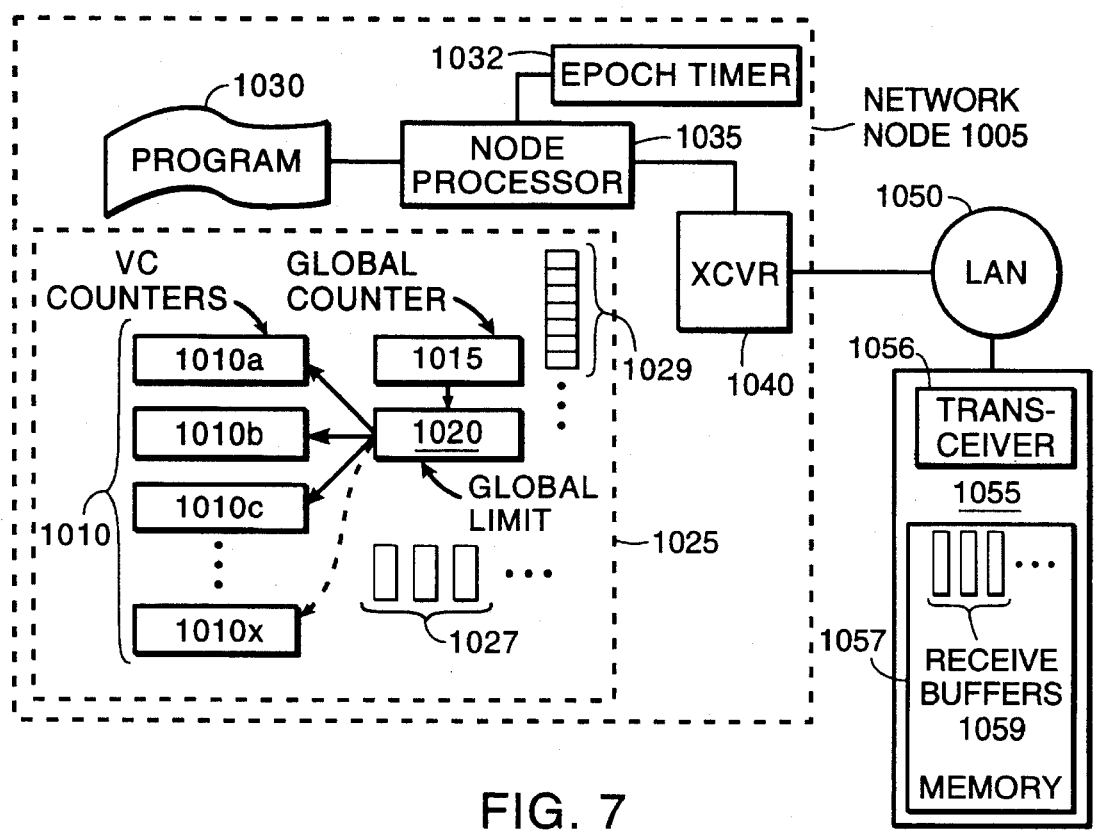
FIG. 7 is a logic drawing of an alternative embodiment of the flow control apparatus.

FIG. 7 is a logic drawing of the elements in a flow control apparatus for a communications link within a network node 1005. A plurality of connection counters 1010, consisting of connection counters 1010a, 1010b, 1010c . . . 1010n, are shown coupled with a global limit register 1020. The number of connection counters n is the maximum possible number of virtual circuits on the communications link.

In the example embodiment of FIG. 7, the connection counters 1010, global counter 1015, and global limit register 1020 are shown contained in a memory 1025. Alternatively, some or all of connection counters 1010, global counter 1015, and global limit register 1020 could be implemented as hardware registers. Further in the example embodiment of FIG. 7 are shown a node processor 1035, coupled with the memory 1025, an epoch timer 1032 coupled with the node processor 1035, a program 1030 running on the node processor 1035, and a transceiver circuit 1040, coupled with the node processor and a network 1050.

It will be evident to one skilled in the art of data and computer communications that the network 1050 could be a local area network (LAN), a wide area network (WAN), a metropolitan area network (MAN), or other type of communications system.

A second network node 1055 is also shown coupled with the LAN 1050. The second network node 1055 includes a transceiver 1056 coupled with the network 1050 and also coupled with a memory 1057. The memory 1057 in the second network node 1055 includes a set of one or more receive buffers 1059, for storing data received from the network 1050.

It will be evident to one skilled in the art of data and computer communications that alternative embodiments to the example embodiment in FIG. 7 include implementations based on other currently available technologies, for example an application specific integrated circuit (ASIC) to perform some or all of the functions performed by the program 1030 running on the node processor 1035. The selection of whether to have the functions performed by the node processor 1035, ASIC, or other type of currently available technology is based on implementation specific trade-offs, for example taking into account the expense of using an ASIC as balanced against the generally faster processing speeds achievable with an ASIC.

The memory 1025 further contains a virtual circuit table 1029, having an entry for each virtual circuit between the network node 5 and other network nodes on the network 1050, and a set of one or more data messages 1027, containing data to be transmitted by the network node 1005 to other nodes on the network 1050.

During operation of the elements shown in FIG. 7, the program 1030 executes on the node processor 1035. The functions performed by the program 1030 are the functions performed by the flow control logic 30 shown in the embodiment of FIG. 1.

Figure 8:
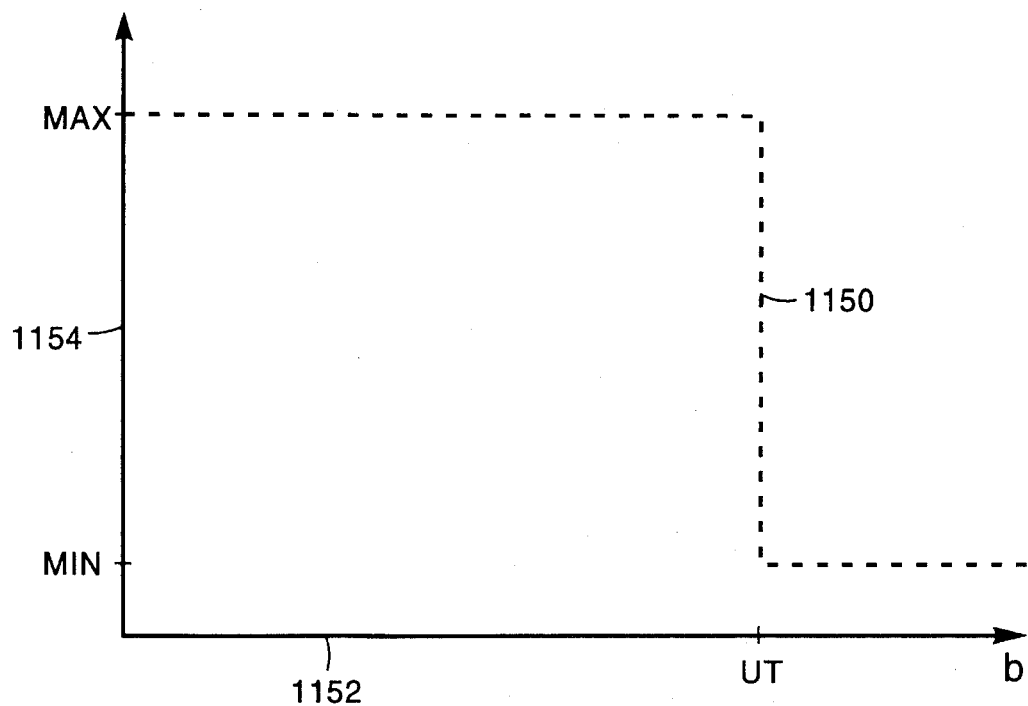
FIG. 8 is a graph showing values of the global limit register in an embodiment using step-wise global limit setting.

During operation of the embodiment in FIG. 7, the global limit alternates between the value Min and the value Max. The global limit is a step-wise function of the global counter value. FIG. 8 shows the values of the global limit register, as a function of the global counter, during operation of the embodiment shown in FIGS. 7 in a transmitting first node. The horizontal axis 1152 of the graph in FIG. 8 represents the value of the global counter. The vertical axis 1154 represents values of the global limit register. The dotted line 1100 shows the values of the global limit register in the first node as a function of the values of the global counter in the first node.

As shown in FIG. 8, during operation of the embodiments of FIGS. 7, the global limit register in the first node is set to Min when the value of the global counter in the first node exceeds an upper threshold value UT.

In the example embodiment above, the same values of Max and Min are used for all connections. In an alternative embodiment Max and Min are chosen on a per connection basis. In the alternative embodiment in which values for Max and Min are chosen independently per connection, the equation for CommonPool is:

$$(\text{MaxRate} * T) - \sum_{i=1}^{N} \text{Min}(i)$$

where Min(i) is the value of Min for connection i.

The above example embodiment also decrements the global limit register from Max to Min in a single step. In an alternative embodiment the global limit register transitions between Max and Min by multiple discrete levels. In the alternative embodiment, the value of the global limit register is set based on a decreasing linear function of the global counter, such that the value of the global limit register is decremented from Max to Min as the global counter increases from a predetermined value to UT.

While the invention has been described with reference to specific embodiments, the description is not meant to be construed in a limiting sense. Various modifications of the disclosed embodiments, as well as other embodiments of the invention, will be apparent to person skilled in the art upon reference to this description. It is therefore contemplated that the appended claims will cover any such modifications or embodiments which fall within the true scope of the invention.

We claim:

1. A flow control apparatus in a first node, comprising:

a plurality of virtual circuits between said first node and a second node;

a global limit register;

means for generating indication that the number of Data Transmission Units transmitted by one of said plurality of virtual circuits during a time period T is equal to or greater than a value of said global limit register; and means, responsive to said global limit register and a transmit event on said one of said plurality of virtual circuits and said means for generating indication, for disabling further transmission over said one of said plurality of virtual circuits responsive to said indication that the number of Data Transmission Units transmitted by said one of said plurality of virtual circuits during said time period T is equal to or greater than said value of said global limit register.

2. The apparatus as in claim 1, further comprising:

an epoch timer having a duration equal to said predetermined time period T; and means, responsive to expiration of said epoch timer, for enabling transmission on said one of said plurality of virtual circuits.

3. The apparatus as in claim 2, further comprising:

a global counter, containing the total number of Data Transmission Units transmitted over all of said plurality of virtual circuits combined, during said time period T;

means, responsive to a transmit event and said global counter, for setting said value of said global limit register to Min when said global counter exceeds an Upper Threshold UT, where UT is equal to (MaxRate * T)−(Min * N), Min/T is the minimum data rate guaranteed to each of said plurality of virtual circuits, N is the total number of said plurality of virtual circuits, and MaxRate is the maximum total data rate permitted over said plurality of virtual circuits combined.

4. The apparatus as in claim 3, further comprising:

means, responsive to expiration of said epoch timer, for setting said global counter to zero.

5. The apparatus as in claim 4, further comprising:

means, responsive to expiration of said epoch timer, for setting said value of said global limit register to Max, where Max is greater than or equal to Min, and less than or equal to CommonPool, and where CommonPool is equal to (MaxRate * T)−(N * Min).

6. The apparatus as in claim 5, further comprising:

a plurality of connection counters, each one of said plurality of connection counters corresponding to one of said plurality of virtual circuits, each one of said plurality of connection counters containing the number of Data Transmission Units transmitted over said corresponding virtual circuit since the previous expiration of said epoch timer;

means for setting each one of said plurality of connection counters to zero responsive to expiration of said epoch timer; and means for comparing one of said plurality of connection counters with said value of said global limit register responsive to transmission of data over said one of said plurality of virtual circuits corresponding with said one of said plurality of connection counters.

* * * * *